(12) United States Patent
Horinaka et al.

(10) Patent No.: US 11,892,021 B2
(45) Date of Patent: Feb. 6, 2024

(54) CONNECTION STRUCTURE

(71) Applicant: HI-LEX CORPORATION, Takarazuka (JP)

(72) Inventors: Takahiro Horinaka, Hyogo (JP); Takuma Imagawa, Hyogo (JP)

(73) Assignee: HI-LEX CORPORATION, Takarazuka (JP)

( * ) Notice: Subject to any disclaimer, the term of this patent is extended or adjusted under 35 U.S.C. 154(b) by 347 days.

(21) Appl. No.: 17/287,689

(22) PCT Filed: Oct. 25, 2019

(86) PCT No.: PCT/JP2019/041881
§ 371 (c)(1),
(2) Date: Apr. 22, 2021

(87) PCT Pub. No.: WO2020/085482
PCT Pub. Date: Apr. 30, 2020

(65) Prior Publication Data
US 2021/0404500 A1     Dec. 30, 2021

(30) Foreign Application Priority Data

Oct. 26, 2018   (JP) ................................ 2018-201911

(51) Int. Cl.
*F16C 1/14*     (2006.01)
*F16B 21/18*    (2006.01)

(52) U.S. Cl.
CPC ............ *F16B 21/18* (2013.01); *F16B 21/186* (2013.01); *F16C 1/14* (2013.01)

(58) Field of Classification Search
CPC .......... F16B 21/18; F16B 21/186; F16C 1/14
See application file for complete search history.

(56) References Cited

U.S. PATENT DOCUMENTS 5,048,996 A * 9/1991 DuBois ................. F16B 21/186
                                                                 403/287
5,518,332 A    5/1996 Katoh
(Continued)

FOREIGN PATENT DOCUMENTS

| GB | 867381 | * | 5/1961 | .............. F16B 21/18 |
| JP | H07151132 A | | 6/1995 | |
| JP | 2017009021 A | | 1/2017 | |

OTHER PUBLICATIONS

International Search Report for International Application No. PCT/JP2019/041881; dated Jan. 7, 2020.

*Primary Examiner* — Michael P Ferguson
(74) *Attorney, Agent, or Firm* — CANTOR COLBURN LLP (57) ABSTRACT

A connection structure is provided, wherein relative movement between outer and inner members is restrained by an engaging member. The engaging member includes first and second bolding elements. A connection part connected to another-side end part of the second holding element is provided in one-side end part of the first holding element. A first extension part is provided in another-side end part of the first holding element The connection part includes second and third extension parts, and a connection element extending substantially parallel to the second holding element. The first holding element and the first and second extension parts are provided such that an angle formed by the first holding element and the second extension part, and an angle formed by the first holding element and the first extension part are smaller than 90°. Use of the connection structure, which is easily formable, restrains the engaging member from being detached.

1 Claim, 7 Drawing Sheets

(56) References Cited

U.S. PATENT DOCUMENTS 9,926,967 B2 * 3/2018 Kawai .................. F16C 1/14
2016/0369829 A1 12/2016 Kawai et al.

* cited by examiner

CONNECTION STRUCTURE

CROSS REFERENCE TO RELATED APPLICATIONS

This is the U.S. national stage of application No. PCT/JP2019/041881 filed on Oct. 25, 2019. Priority under 35 U.S.C. § 119(a) and 35 U.S.C. § 365(b) is claimed from Japanese Application No. 2018-201911, filed Oct. 26, 2018, the disclosure of which is also incorporated herein by reference.

TECHNICAL FIELD

The present invention relates to a connection structure.

BACKGROUND ART

A connection structure in which a state of connection between two members is maintained in a state in which one member is fitted into the other member from the outside is used, for example, for transmission of a driving force such as a connection of a control cable to a transmission.

As such a connection structure, a connection structure is disclosed in which a shaft end washer including a slit, and a shaft member are connected by a clip that is an engaging member and engages with the shaft end washer and the shaft member (for example, see Patent Literature (hereinafter, referred to as "PTL") 1). This clip has elasticity, includes two insertion parts configured such that one insertion part is separated from the other insertion part, and therefore makes it easy to form the connection structure and has good workability.

CITATION LIST

Patent Literature

PTL 1
Japanese Patent Application Laid-Open No. H07-151132

SUMMARY OF INVENTION

Technical Problem

In the connection structure described above, however, the two insertion parts (engaging part) of the clip are easily separated from each other when an external force is applied to the clip, and thus, the clip is easily detached from the connection structure. Accordingly, in a case where the engaging member is detached from the connection structure, another engagement work is required.

An object of the present invention is to provide a connection structure which is easily formable, and which restrains an engaging member from being detached.

Solution to Problem

A connection structure of the present invention, wherein relative movement between an outer member and an inner member is restrained by an engaging member that engages each of the outer member and the inner member, wherein:
the inner member includes:
a fitting part that fits into the outer member; and
a pair of inner-member engaging parts that engages with the engaging member provided outside the inner member,
the outer member includes:
a fitted part into which the inner member fits;
an opening that communicates between the inner-member engaging part and an outside of the outer member; and
an outer-member engaging part that engages with the engaging member, and the engaging member includes:
a holding part which is attached to the outer member so as to hold the outer member, and which engages with the inner-member engaging part and the outer-member engaging part, wherein
the holding part includes:
a first holding element including one-side end part and another-side end part; and
a second holding element including one-side end part and another-side end part,
the first holding element and the second holding element are disposed substantially parallel to each other such that each of the one-side end parts is on a side of a same direction in an axial direction of the first holding element or the second holding element,
a connection part connected to the other side end part of the second holding element is provided in the one-side end part of the first holding element,
a first extension part extending from the other side end portion of the first holding element in a direction intersecting the axial direction of the first holding element is provided in the other side end part of the first holding element,
the connection part includes:
a second extension part extending in a direction intersecting the axial direction of the first holding element;
a third extension part extending from the other side end portion of the second holding element in a direction intersecting the axial direction of the second holding element; and
a connection element connected to each end part of the second extension part and the third extension part and extending substantially parallel to the second holding element,
the first holding element, the first extension part, and the second extension part are provided such that an angle formed by the first holding element and the second extension part, and an angle formed by the first holding element and the first extension part are each smaller than 90°,
the second extension part and the connection part are provided such that an angle formed by the second extension part and the connection part is 90° or larger,
the second holding element has a length such that an end part of the second holding element comes into contact with the outer member or the inner member when the second holding element moves such that the angle formed by the first holding element and the second extension part is enlarged, and
the first extension part at least has a length substantially reaching an intersection of the third extension part and the second holding element.

Advantageous Effects of Invention

The connection structure of the present invention is easily formable, and restrains an engaging member from being detached.

DESCRIPTION OF EMBODIMENTS

Hereinafter, a connection structure of an embodiment of the present invention will be described with reference to the accompanying drawings. Note that, the embodiment to be illustrated below is only an example, and the connection structure of the present invention is not limited to the following embodiment.

Figure 1:
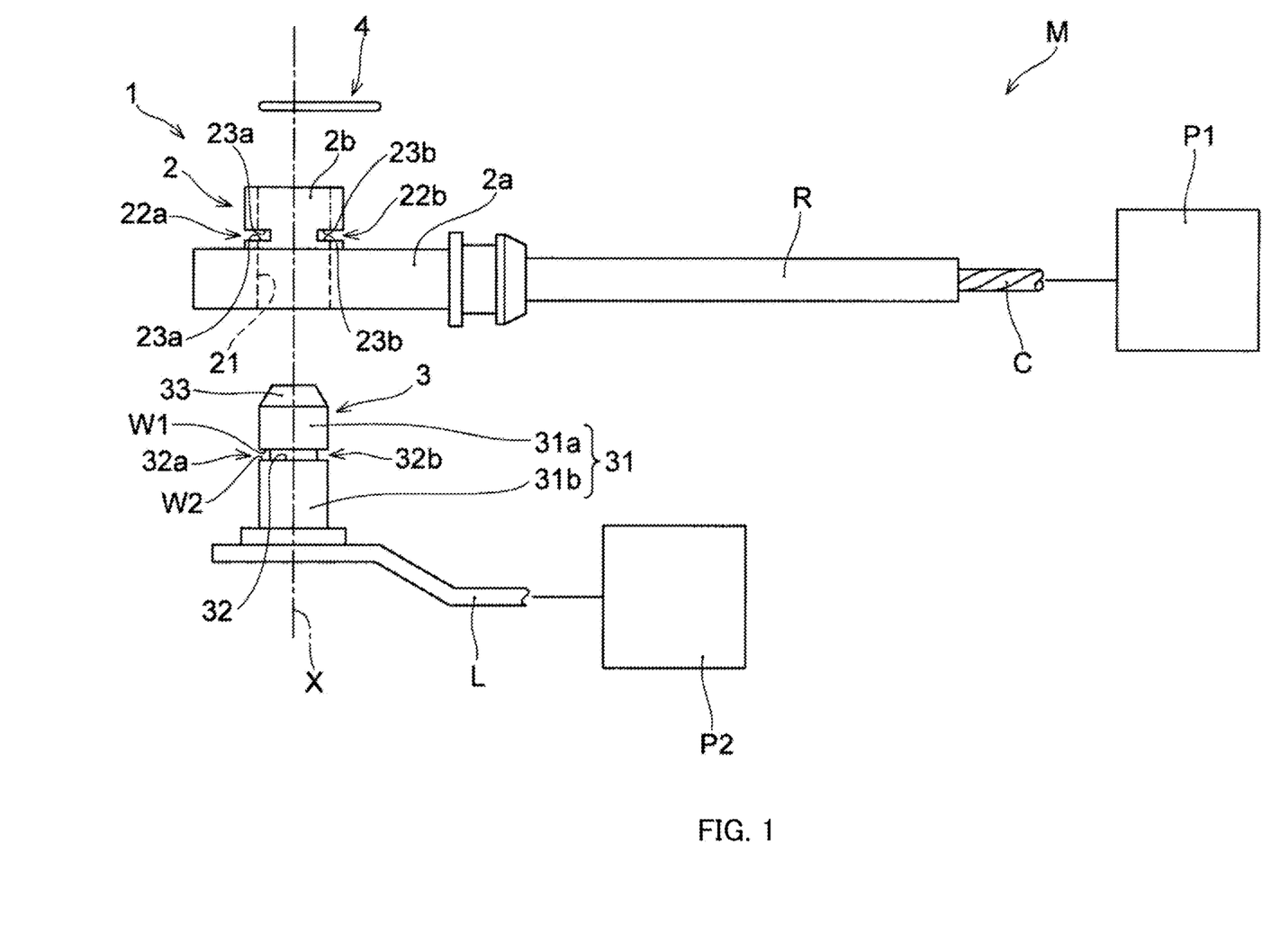
FIG. 1 is a schematic side view of a state before a connection structure of an embodiment of the present invention is assembled.
Figure 2:
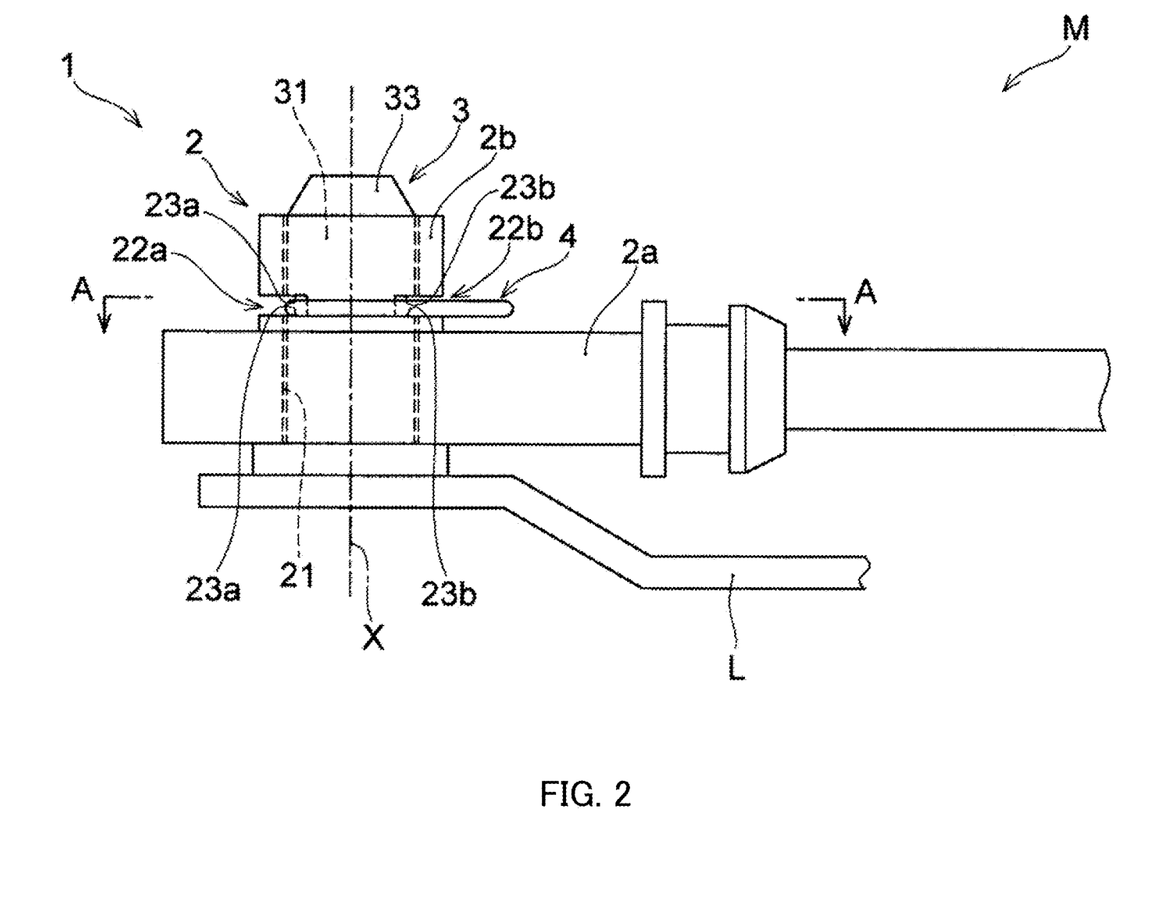
FIG. 2 is a side view of a state after the connection structure of FIG. 1 is assembled.
Figure 3:
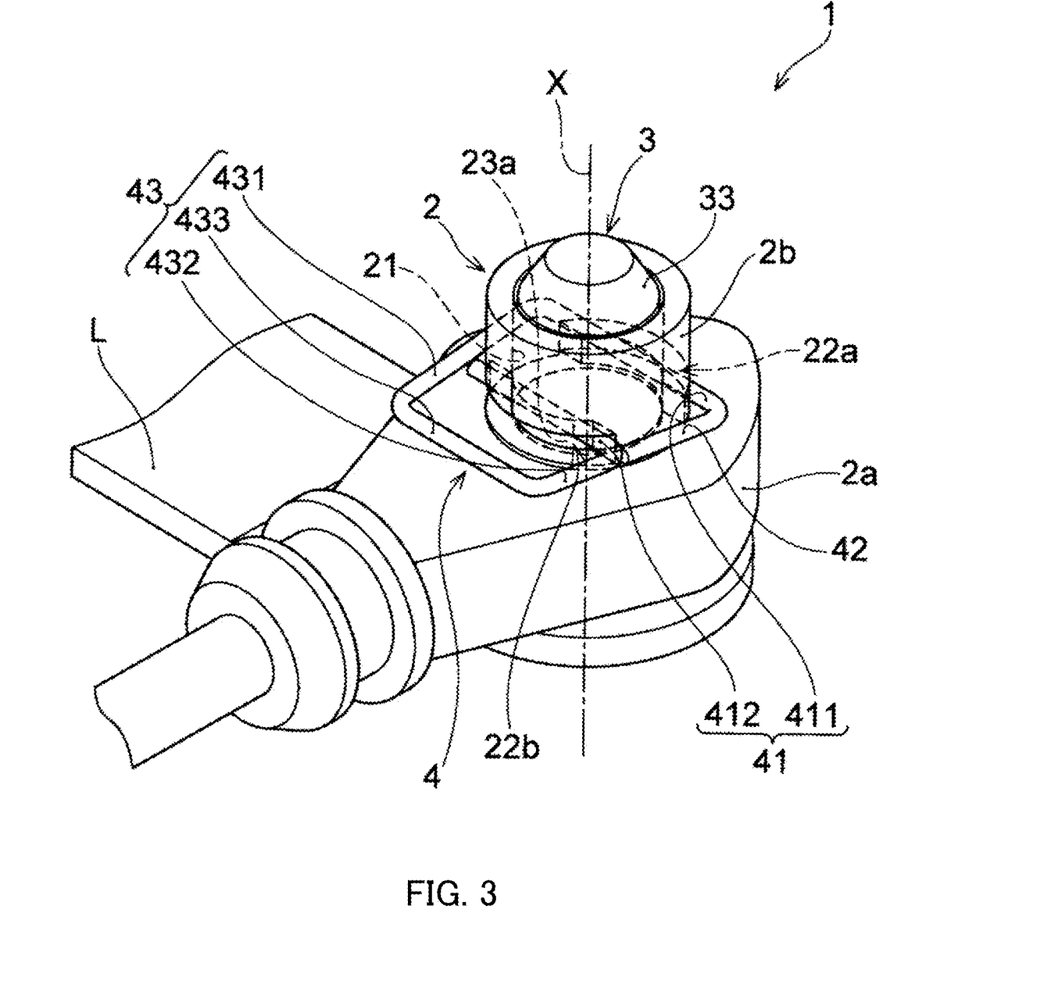
FIG. 3 is a perspective view of the connection structure of FIG. 2.

In connection structure 1 of the present embodiment, as illustrated in FIG. 1 to FIG. 3, outer member 2 and inner member 3 disposed inside outer member 2 are connected. In connection structure 1, as illustrated in FIG. 2 and FIG. 3, relative movement between outer member 2 and inner member 3 is restrained by engaging member 4 that engages with each of outer member 2 and inner member 3, and outer member 2 and inner member 3 are connected.

An object to which connection structure 1 is applied is not particularly limited as long as outer member 2 and inner member 3 are connected by engaging member 4 therein. For example, in operation force transmission mechanism M including operating part P1 such as a shift lever, cable C operated by operating part P1, and part to be operated (hereinafter, referred to as "operated part") P2 such as a transmission as illustrated in FIG. 1, connection structure 1 can be provided at a connection point between cable C and operated part P2.

In the present embodiment, as illustrated in FIG. 1, operation force transmission mechanism M including connection structure 1 includes operating part P1, cable C connected to operating part P1, outer member 2 provided in an end part of cable C, inner member 3 that is connected to outer member 2 by engaging member 4, and operated part P2 connected to inner member 3. Operating part P1 is a member, such as a shift lever, which adds an operation to cable C. Cable C is connected to operating part P1 on a side of one end of cable C and is connected to outer member 2 on a side of the other end thereof. Cable C can be an inner cable of a publicly known control cable. Cable C is routed in a predetermined routing path between operating part P1 and outer member 2. Note that, at least in part of the routing path, cable C may be inserted through an outer casing (not illustrated). In the present embodiment, an end part (the other end) of cable C includes rod R, and rod R and outer member 2 is connected. In the present embodiment, inner member 3 is provided on lever L that is swingably provided in a transmission serving as operated part P2.

In the present embodiment, cable C is operated when operating part P1 is operated, and outer member 2 to which the other end of cable C is connected is operated by operation of cable C. When outer member 2 is operated, a force is applied from outer member 2 to inner member 3 connected to outer member 2 by engaging member 4. Thus, lever L connected to inner member 3 swings about a rotation axis (not illustrated) of lever L and an operation force of operating part P1 is transmitted to operated part P2 that is the transmission.

As illustrated in FIG. 1, inner member 3 includes fitting part 31 that fits into outer member 2, and a pair of inner-member engaging parts 32a and 32b that engages with engaging member 4 provided outside inner member 3. Further, outer member 2 includes fitted part 21 into which inner member 3 fits, openings 22a and 22b that communicate between inner-member engaging parts 32a and 32b and an outside of outer member 2, and outer-member engaging parts 23a and 23b that engage with engaging member 4.

Inner member 3 fits into outer member 2 so as to be positioned inwardly with respect to outer member 2, and is connected to outer member 2 by engaging member 4. Inner member 3 fits into outer member 2 so as to be relatively movable in a predetermined direction in a state in which engaging member 4 is not engaged with inner member 3, and inner member 3 is connected to outer member 2 by engagement of engaging member 4 with inner member 3 such that relative movement of inner member 3 in the predetermined direction is restrained.

Fitting part 31 of inner member 3 fits into fitted part 21 of outer member 2. In the present embodiment, fitting part 31 is a shaft-shaped portion that is fitted into fitted part 21, is inserted into fitted part 21 including a through-hole, and fits into fitted part 21. In the present embodiment, fitting part 31 is formed in a substantially columnar shape, and is configured to be relatively rotatable around axis X of inner member 3 with respect to outer member 2 in a state in which outer member 2 and inner member 3 are connected by engaging member 4. However, the shape of fitting part 31 is not particularly limited as long as fitting part 31 is capable of fitting into fitted part 21, and may be other shapes such as a prismatic shape.

Figure 4:
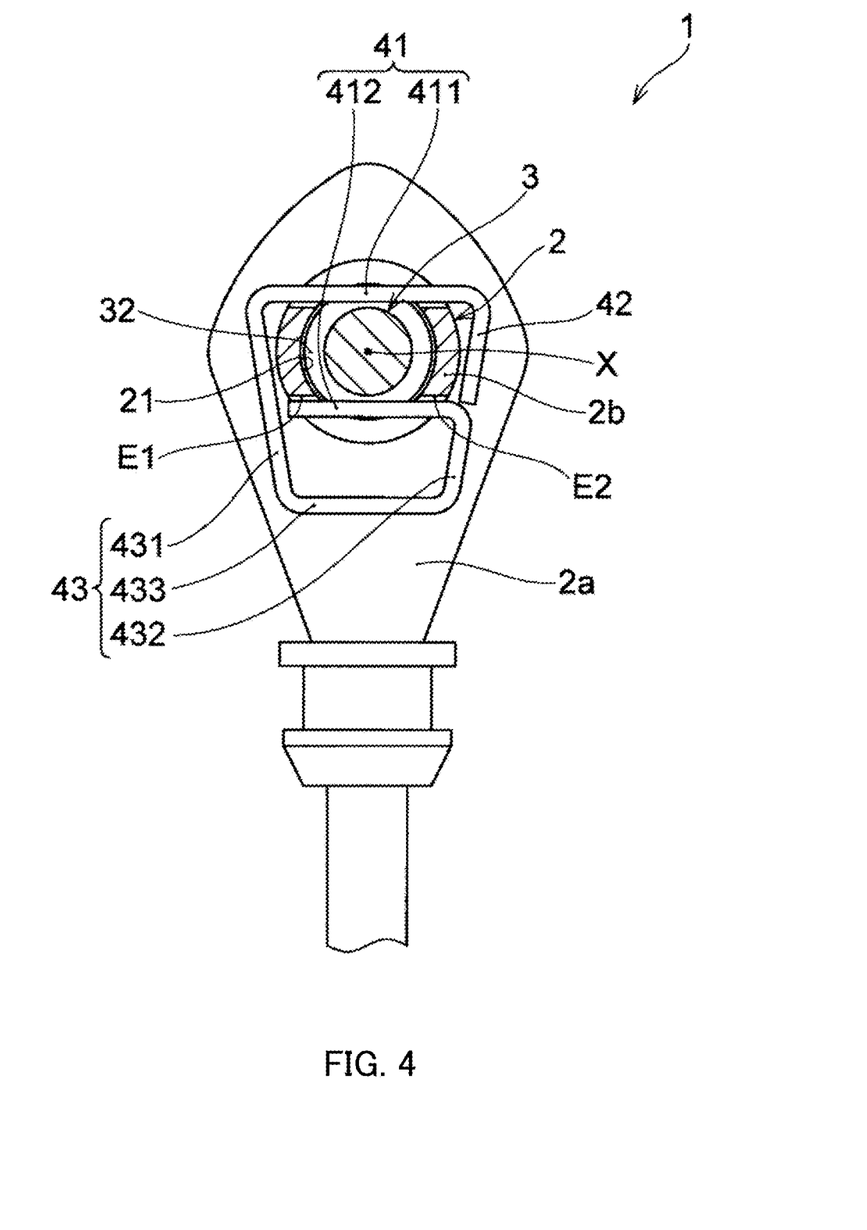
FIG. 4 is a cross-sectional view taken along line A-A of FIG. 2.

The pair of inner-member engaging parts 32a and 32b engages with engaging member 4 provided outside inner member 3. In the present embodiment, as illustrated in FIG. 3 and FIG. 4, engaging member 4 engages with inner-member engaging parts 32a and 32b from the outside of outer member 2 via openings 22a and 22b of outer member 2. In the present embodiment, as illustrated in FIG. 2, inner-member engaging parts 32a and 32b engage with engaging member 4 on both sides in a direction of axis X of inner member 3, thereby restraining relative movement of engaging member 4 on the both sides in the direction of axis X of inner member 3. Specifically, in the present embodiment, inner member 3 includes groove 32 recessed with respect to an outer surface of fitting part 31, and a pair of wall parts W1 and W2 extending in a direction vertical to the direction of axis X and facing each other configures inner-member engaging parts 32a and 32b in groove 32. Wall parts W1 and W2 engage with engaging member 4, and thereby relative movement of outer member 2 and inner member 3 in both directions in the direction of axis X is regulated. Note that, in the present embodiment, groove 32 is an annular groove (hereinafter, referred to as "annular groove 32") formed around axis X of inner member 3.

In the present embodiment, as illustrated in FIG. 1 to FIG. 4, inner-member engaging parts 32a and 32b are provided in a pair at positions facing each other, with axis X therebetween, around axis X of inner member 3. The pair of inner-member engaging parts 32a and 32b engages with each of first holding element 411 and second holding element 412 of holding part 41 of engaging member 4, which will be described later. Note that, the pair of inner-member engaging parts 32a and 32b may be provided at least at two positions so as to be capable of engaging with first holding element 411 and second holding element 412, respectively. Accordingly, the pair of inner-member engaging parts 32a and 32b may be provided so as to be continuous to each other by annular groove 32 formed continuously around axis X of inner member 3 as in the present embodiment, or may be provided not continuously but independently.

The shape of inner member 3 is not particularly limited as long as inner member 3 includes fitting part 31 and inner-member engaging parts 32a and 32b and is configured to be connected to outer member 2 by engaging with engaging member 4. In the present embodiment, as illustrated in FIG. 1 to FIG. 3, inner member 3 is a shaft-shaped member, and protrudes from lever L of the transmission at a distal end far from the rotation axis of lever L. Inner member 3 includes leading-end part 33 including a tapered surface, first fitting part 31a adjacent to leading-end part 33 in the direction of axis X of inner member 3 and having a columnar shape, second fitting part 31b provided on a side of a base end (on a side of lever L) of inner member 3 and having a columnar shape, and annular groove 32 provided between first fitting part 31a and second fitting part 31b in the direction of axis X and including inner-member engaging parts 32a and 32b.

When outer member 2 is moved to inner member 3 in the direction of axis X such that leading-end part 33 of inner member 3 fits into fitted part 21 of outer member 2, leading-end part 33 penetrates holding part 41 of engaging member 4 attached to opening 22a and 22b of outer member 2. When outer member 2 is further moved in the direction of axis X, holding part 41 is elastically deformed by the tapered surface of leading-end part 33 of inner member 3 and a distance is expanded. When holding part 41 of engaging member 4 attached to outer member 2 moves to the position of annular groove 32 of inner member 3, holding part 41 that is elastically deformed and expanded moves toward a bottom part of annular groove 32, in a direction in which the distance therebetween is narrowed. Thus, holding part 41 of engaging member 4 engages with inner-member engaging parts 32a and 32b.

Outer member 2 is a member that fits into inner member 3 so as to be outside inner member 3. As illustrated in FIG. 1 to FIG. 3, outer member 2 may include fitted part 21, openings 22a and 22b, and outer-member engaging parts 23a and 23b, and be configured to engage with engaging member 4, thereby causing inner member 3 and outer member 2 to be connected. The shape of outer member 2 is not particularly limited. In the present embodiment, outer member 2 is configured such that inner member 3 having a shaft shape is inserted into outer member 2, and includes body part 2a having a plate shape, and tubular part 2b protruding in a cylindrical shape from one surface of body part 2a as illustrated in FIG. 1 to FIG. 3. In body part 2a and tubular part 2b, fitted part 21 into which inner member 3 is insertable is provided. In the present embodiment, outer member 2 is an eye end provided in an end part of cable C and connected to the transmission. Rod R to which cable C is fixed is connected to outer member 2, and outer member 2 is operated in accordance with operation of cable C.

Fitted part 21 of outer member 2 is a portion into which fitting part 31 of inner member 3 fits. In the present embodiment, fitted part 21 includes a through-hole into which inner member 3 having a shaft shape is inserted, and fitting part 31 of inner member 3 is inserted into the through-hole and thereby fits into fitted part 21. In the present embodiment, fitted part 21 is provided such that a substantially columnar space is formed therein, but the shape of fitted part 21 is not particularly limited as long as fitting part 31 is fittable into fitted part 21. Further, although the through-hole is formed in fitted part 21 in the present embodiment, fitted part 21 may have a recessed part that is not penetrated.

In outer member 2, openings 22a and 22b are portions that open so as to communicate between inner-member engaging parts 32a and 32b of inner member 3 and the outside of outer member 2 when outer member 2 fits into inner member 3. Openings 22a and 22b open with a size and a shape that allow holding part 41 of engaging member 4 to engage with inner-member engaging parts 32a and 32b of inner member 3. In the present embodiment, in a state before outer member 2 is attached to inner member 3, engaging member 4 is attached to opening 22a and 22b of outer member 2. In this case, holding part 41 of engaging member 4 extends at positions on an inside with respect to an inner peripheral surface of fitted part 21 (see FIG. 4).

In the present embodiment, openings 22a and 22b open on side surfaces of tubular part 2b of outer member 2, and communicate between the inside and the outside in a radial direction of tubular part 2b. In the present embodiment, as illustrated in FIG. 1 to FIG. 4, openings 22a and 22b are provided at two positions so as to face each other with a shaft center (axis X) of tubular part 2b therebetween so as to correspond to first holding element 411 and second holding element 412 of holding part 41. Openings 22a and 22b have a width in the direction of axis X, which is slightly wider than the thickness of a wire of first holding element 411 and second holding element 412, and are formed in a slit shape extending along a circumferential direction of tubular part 2b.

Outer-member engaging parts 23a and 23b engage with engaging member 4, and restrain engaging member 4 from moving in a predetermined direction with respect to outer member 2. In the present embodiment, as illustrated in FIG. 2, outer-member engaging parts 23a and 23b engage with engaging member 4 in the direction of axis X of inner member 3, and restrain engaging member 4 from moving in the direction of axis X with respect to outer member 2. Engaging member 4 engages with outer-member engaging parts 23a and 23b, and further engaging member 4 engages with inner-member engaging parts 32a and 32b of inner member 3, and thereby relative movement between outer member 2 and inner member 3 is restrained. By restraining relative movement between outer member 2 and inner member 3, detachment of outer member 2 from inner member 3 or detachment of inner member 3 from outer member 2 is restrained. In the present embodiment, the relative movement between outer member 2 and inner member 3, which is restrained by engaging member 4, is a movement in the direction of axis X of inner member 3. However, the direction of the relative movement between outer member 2 and inner member 3, which is restrained by engaging member 4, varies depending on engagement directions of engaging member 4 with outer member 2 and inner member 3, and is not limited to the direction of axis X of inner member 3.

The shape and structure of outer-member engaging parts 23a and 23b are not particularly limited as long as outer-member engaging parts 23a and 23b engage with engaging member 4 and are capable of restraining engaging member 4 from moving in a predetermined direction with respect to outer member 2. In the present embodiment, as illustrated in FIG. 2 and FIG. 3, outer-member engaging parts 23a and 23b are opening edges of openings 22a and 22b that engage with engaging member 4 in the direction of axis X of inner member 3. Of the opening edges of openings 22a and 22b, opening edges located on both sides in the direction of axis X and extending vertical to the direction of axis X abut on holding part 41 of engaging member 4, and thereby engaging member 4 is restrained from moving in the direction of axis X with respect to outer member 2. Note that, outer-member engaging parts 23a and 23b may be provided in portions other than openings 22a and 22b, for example, in body part 2a outside tubular part 2b and engage with engaging member 4 as long as outer-member engaging parts 23a and 23b are capable of restraining engaging member 4 from moving with respect to outer member 2.

Engaging member 4 engages with outer member 2 and inner member 3, restrain relative movement between outer member 2 and inner member 3, and connect outer member 2 and inner member 3 together. Engaging member 4 is configured, at least partially, by a material having flexibility. In the present embodiment, engaging member 4 is formed by bending a single wire having flexibility (spring elasticity), such as a metal wire, within one plane surface. Engaging member 4 is configured to be elastically deformed when engaging member 4 is attached to outer-member engaging parts 23a and 23b of outer member 2 or when outer member 2 is attached to inner member 3. In the present embodiment, engaging member 4 is attached to outer member 2 such that the one plane surface on which the bent wire passes is substantially vertical to the direction of axis X of inner member 3.

Figure 5:
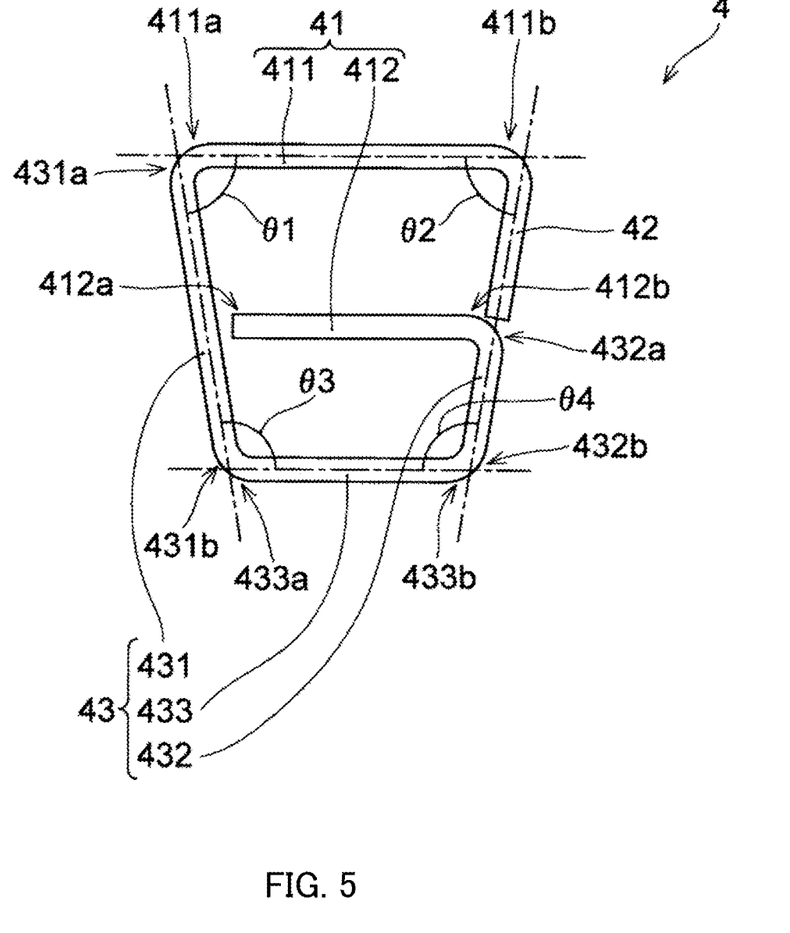
FIG. 5 is a plan view of an engaging member used in the connection structure of FIG. 1.

As illustrated in FIG. 3 and FIG. 4, engaging member 4 includes holding part 41 which is attached to outer member 2 so as to hold outer member 2, and which engages with inner-member engaging parts 32a and 32b and outer-member engaging parts 23a and 23b. As illustrated in FIG. 5, holding part 41 includes first holding element 411 including one-side end part 411a and another-side end part 411b, and second holding element 412 including one-side end part 412a and another-side end part 412b. First holding element 411 and second holding element 412 each extend linearly. As illustrated in FIG. 5, first holding element 411 and second holding element 412 are disposed substantially parallel to each other such that each of one-side end parts 411a and 412a is on a side of the same direction (both on the left side in FIG. 5) in an axial direction (of first holding element 411 or second holding element 412). Note that, one-side end part 411a of first holding element 411 is an end part on one side of first holding element 411 in the longitudinal direction. In the present embodiment, first holding element 411 is connected to second extension part 431 to be described later in one-side end part 411a. Another-side end part 411b of first holding element 411 is an end part located on a side opposite to one-side end part 411a of first holding element 411 in the longitudinal direction. In the present embodiment, first holding element 411 is connected to first extension part 42 to be described later in another-side end part 411b. One-side end part 412a of second holding element 412 is an end part on one side of second holding element 412 in the longitudinal direction. In the present embodiment, one-side end part 412a of second holding element 412 is a free end slightly separated from an inner part of second extension part 431. Another-side end part 412b of second holding element 412 is an end part located on a side opposite to one-side end part 412a of second holding element 412 in the longitudinal direction. In the present embodiment, second holding element 412 is connected to third extension part 432 to be described later in another-side end part 412b.

As illustrated in FIG. 3 and FIG. 4, first holding element 411 and second holding element 412 of holding part 41 are attached to outer member 2 so as to hold outer member 2. In the present embodiment, when engaging member 4 is attached to tubular part 2b of outer member 2, first holding element 411 and second holding element 412 are elastically deformed such that a distance therebetween is widened, the widened distance becomes narrower when first holding element 411 and second holding element 412 are positioned in openings 22a and 22b of outer member 2, and first holding element 411 and second holding element 412 engage with openings 22a and 22b. First holding element 411 and second holding element 412 that have entered opening 22a and 22b of outer member 2 are disposed such that the distance between first holding element 411 and second holding element 412 is narrower than the inner diameter of the inner peripheral surface of fitted part 21 (see FIG. 4).

As described above, in a state before outer member 2 fits into inner member 3, first holding element 411 and second holding element 412 of engaging member 4 are engaged with outer-member engaging parts 23a and 23b of outer member 2. When outer member 2 fits into inner member 3 in this state, first holding element 411 and second holding element 412 are elastically deformed by inner member 3 and the distance therebetween is expanded. When first holding element 411 and second holding element 412 move to the positions of inner-member engaging parts 32a and 32b in the direction of axis X, first holding element 411 and second holding element 412 that are elastically deformed and expanded move in a direction in which the distance therebetween is narrowed, and engage with inner-member engaging parts 32a and 32b. Thus, engaging member 4 engages with both outer member 2 and inner member 3, and outer member 2 and inner member 3 are connected.

As illustrated in FIG. 5, another-side end part 411b of first holding element 411 is provided with first extension part 42 that extends from another-side end part 411b of first holding element 411 in a direction intersecting an axial direction of first holding element 411. In a separating direction between first holding element 411 and second holding element 412, first extension part 42 linearly extends in a direction from first holding element 411 toward second holding element 412. When engaging member 4 will move in one of the axial direction of first holding element 411 or an axial direction of second holding element 412 (for example, the left side in FIG. 4), first extension part 42 abuts on outer member 2 and restrains engaging member 4 from being detached from outer member 2.

Further, as illustrated in FIG. 5, connection part 43 connected to another-side end part 412b of second holding element 412 is provided in one-side end part 411a of first holding element 411. Connection part 43 includes second extension part 431 extending in the direction intersecting an axial direction of first holding element 411, third extension part 432 extending from another-side end part 412b of second holding element 412 in a direction intersecting the axial direction of second holding element 412, and connection element 433 connected to each end part of second extension part 431 and third extension part 432 and extending substantially parallel to second holding element 412. In the present embodiment, as illustrated in FIG. 5, second extension part 431, connection element 433, and third extension part 432 are bent and extend, and thereby connection part 43 connects one-side end part 411a of first holding element 411 and another-side end part 412b of second holding element 412.

As illustrated in FIG. 5, in the separating direction between first holding element 411 and second holding element 412, second extension part 431 linearly extends in the direction from first holding element 411 toward second holding element 412. Second extension part 431 extends from one-side end part 411a of first holding element 411, passes near a leading end of one-side end part 412a of second holding element 412, and is connected to one-side end part 433a of connection element 433. In the present embodiment, second extension part 431 includes first end part 431a and second end part 431b. First end part 431a of second extension part 431 is connected to one-side end part 411a of first holding element 411, and second end part 431b is connected to one-side end part 433a of connection element 433.

When engaging member 4 will move in the other of the axial direction of first holding element 411 or the axial direction of second holding element 412 (for example, the right side in FIG. 4), second extension part 431 abuts on outer member 2 and restrains engaging member 4 from being detached from outer member 2. In the present embodiment, first extension part 42 and second extension part 431 restrain engaging member 4 from being detached from outer member 2 in the axial direction of first holding element 411 or second holding element 412. Further, first holding element 411 and second holding element 412 abut on outer member 2, and thereby movement of engaging member 4 in a direction vertical to the axial direction of first holding element 411 or second holding element 412 (the separating direction between first holding element 411 and second holding element 412) is regulated. Thus, in the present embodiment, engaging member 4 is restrained from being detached from outer member 2 by first holding element 411, second holding element 412, first extension part 42, and second extension part 431 against an external force within a predetermined range applied to engaging member 4.

As illustrated in FIG. 5, connection element 433 connects second extension part 431 and third extension part 432. Connection element 433 extends substantially parallel to first holding element 411 and second holding element 412, and includes one-side end part 433a and another-side end part 433b. Note that, one-side end part 433a of connection element 433 is an end part located on a side of the same direction as one-side end parts 411a and 412a of first holding element 411 and second holding element 412 in the axial direction of connection element 433. Another-side end part 433b of connection element 433 is an end part opposite to one-side end part 433a.

As illustrated in FIG. 5, third extension part 432 connects connection element 433 and second holding element 412. In the present embodiment, third extension part 432 extends substantially parallel to or coaxially with first extension part 42. Third extension part 432 includes first end part 432a and second end part 432b. First end part 432a of third extension part 432 is connected to another-side end part 412b of second holding element 412, and second end part 432b is connected to another-side end part 433b of connection element 433.

Further, in the present embodiment, as illustrated in FIG. 5, first holding element 411, first extension part 42 and second extension part 431 are provided such that angle θ1 formed by first holding element 411 and second extension part 431, and angle θ2 formed by first holding element 411 and first extension part 42 are smaller than 90°. Note that, a connection portion between first holding element 411 and second extension part 431 may be curved. In this case, angle θ1 formed by first holding element 411 and second extension part 431 refers to an angle formed by an axis of first holding element 411 and an axis of second extension part 431. Similarly, a connection portion between first holding element 411 and first extension part 42 may be curved. In this case, angle θ2 formed by first holding element 411 and first extension part 42 refers to an angle formed by the axis of first holding element 411 and an axis of first extension part 42.

By angle θ1 formed by first holding element 411 and second extension part 431 and angle θ2 formed by first holding element 411 and first extension part 42 being smaller than 90°, a distance between first extension part 42 and second extension part 431 in a direction parallel to the axis of first holding element 411 becomes smaller from first holding element 411 toward second holding element 412 as illustrated in FIG. 4 and FIG. 5. Accordingly, a distance between first extension part 42 and outer member 2 (an outer surface of tubular part 2b in the present embodiment) and a distance between second extension part 431 and outer member 2 (the outer surface of tubular part 2b in the present embodiment) are relatively large on a side of first holding element 411 and are relatively small on a side of second holding element 412. Accordingly, as compared with a case where angle θ1 formed by first holding element 411 and second extension part 431 and angle θ2 formed by first holding element 411 and first extension part 42 are 90°, engaging member 4 is easily attached to outer member 2 by attachment from the side of first holding element 411 since a gap therebetween is wide. Furthermore, since a distance between outer member 2, and first extension part 42 and second extension part 431 is small on the side of second holding element 412, first extension part 42 and second extension part 431 easily abut on an outer surface of outer member 2 (the outer surface of tubular part 2b) when engaging member 4 will rotate around axis X. Accordingly, even when an external force in a direction in which engaging member 4 is rotated around axis X of inner member 3 is applied to engaging member 4, first extension part 42 or second extension part 431 comes into contact with the outer surface of outer member 2 (the outer surface of tubular part 2b) and the rotation of engaging member 4 is restrained. Thus, detachment of engaging member 4 from outer member 2 due to widening of a gap between first extension part 42 and an intersection (another-side end part 412b of second holding element 412) of second holding element 412 and third extension part 432 when engaging member 4 will rotate is restrained.

Angle θ1 formed by first holding element 411 and second extension part 431 is not particularly limited as long as angle θ1 is smaller than 90°, but is preferably, for example, 45° or larger and smaller than 90°, and preferably 60° or larger and 85° or smaller. Further, angle θ2 formed by first holding element 411 and first extension part 42 is not particularly limited as long as angle θ2 is smaller than 90°, but is preferably, for example, 45° or larger and smaller than 90°, and preferably 60° or larger and 85° or smaller. Further, angle θ1 formed by first holding element 411 and second extension part 431 and angle θ2 formed by first holding element 411 and first extension part 42 may be the same angle or different angles.

Connection element 433 is substantially parallel to second holding element 412 as described above, and second extension part 431 and connection element 433 are provided such that angle θ3 formed by second extension part 431 and connection element 433 is 90° or larger. Note that, a connection portion between second extension part 431 and connection element 433 may be curved. In this case, angle θ3 formed by second extension part 431 and connection element 433 refers to an angle formed by the axis of second extension part 431 and an axis of connection element 433. Angle θ3 formed by second extension part 431 and connection element 433 is not particularly limited as long as angle θ3 is 90° or larger, but is preferably, for example, larger than 90° and 135° or smaller, and preferably 95° or larger and 120° or smaller.

Further, in the present embodiment, third extension part 432 and connection element 433 are provided such that angle θ4 formed by third extension part 432 and connection element 433 is 90° or larger. Note that, a connection portion between third extension part 432 and connection element 433 may be curved. In this case, angle θ4 formed by third extension part 432 and connection element 433 refers to an angle formed by an axis of third extension part 432 and the axis of connection element 433. The angle of angle θ4 formed by third extension part 432 and connection element 433 is not particularly limited and may be smaller than 90°, but is preferably, for example, larger than 90° and 135° or smaller, and preferably 95° or larger and 120° or smaller.

Figure 6:
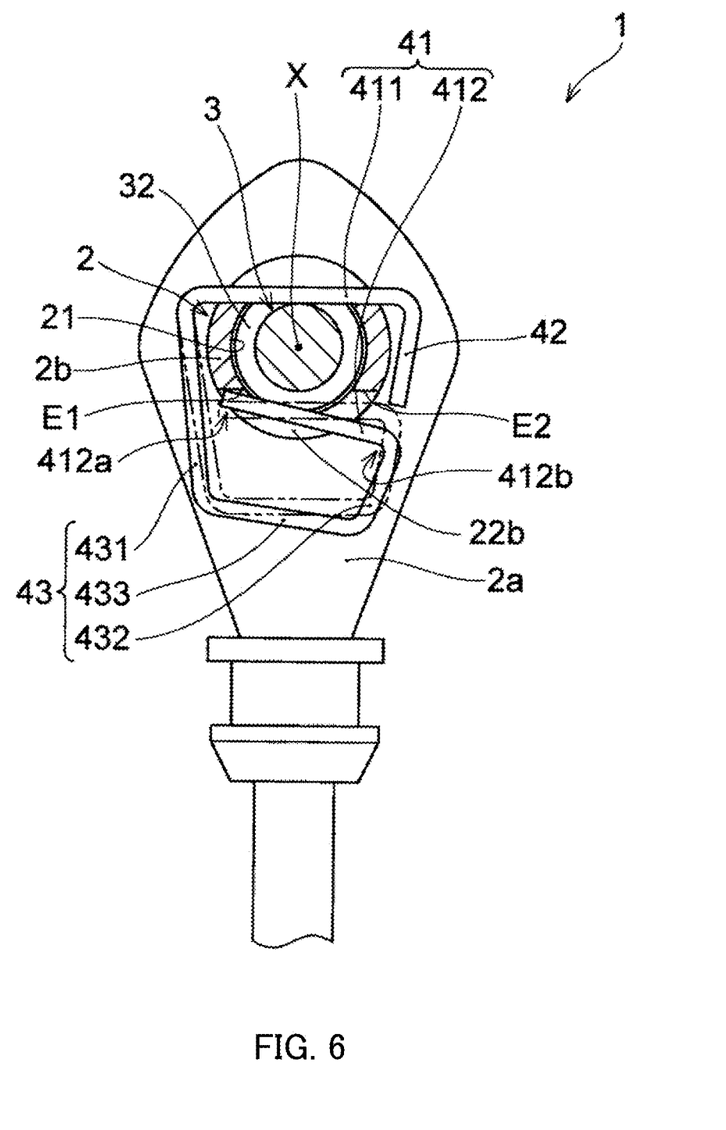
FIG. 6 illustrates a state in which a second holding element of the engaging member is deformed from the state illustrated in FIG. 4 such that an angle formed by a first holding element and a second extension part of the engaging member is expanded.

Further, second holding element 412 has a length such that an end part of second holding element 412 comes into contact with outer member 2 or inner member 3 when second holding element 412 moves such that angle θ1 formed by first holding element 411 and second extension part 431 is enlarged. As illustrated in FIG. 6, when second holding element 412 moves (is deformed) such that angle θ1 (see FIG. 5) formed by first holding element 411 and second extension part 431 becomes larger, a force to detach second holding element 412 from opening 22b is applied to second holding element 412. Since second holding element 412 has the length such that the end part thereof comes into contact with outer member 2 or inner member 3, one-side end part 412a or another-side end part 412b of second holding element 412 abuts on outer member 2 or inner member 3 when the force to detach second holding element 412 from opening 22b is applied to second holding element 412. Thus, holding element 412 is restrained from moving in a direction in which second holding element 412 is detached from opening 22b, and engaging member 4 is restrained from being detached from outer member 2. In the present embodiment, as illustrated in FIG. 6, one end portion 412a of second holding element 412 comes into contact with end part E1 (see FIG. 6), which is one end part of the opening edge of opening 22b, in the circumferential direction of tubular part 2b of outer member 2, and thereby second holding element 412 is restrained from being detached from opening 22b.

Figure 7:
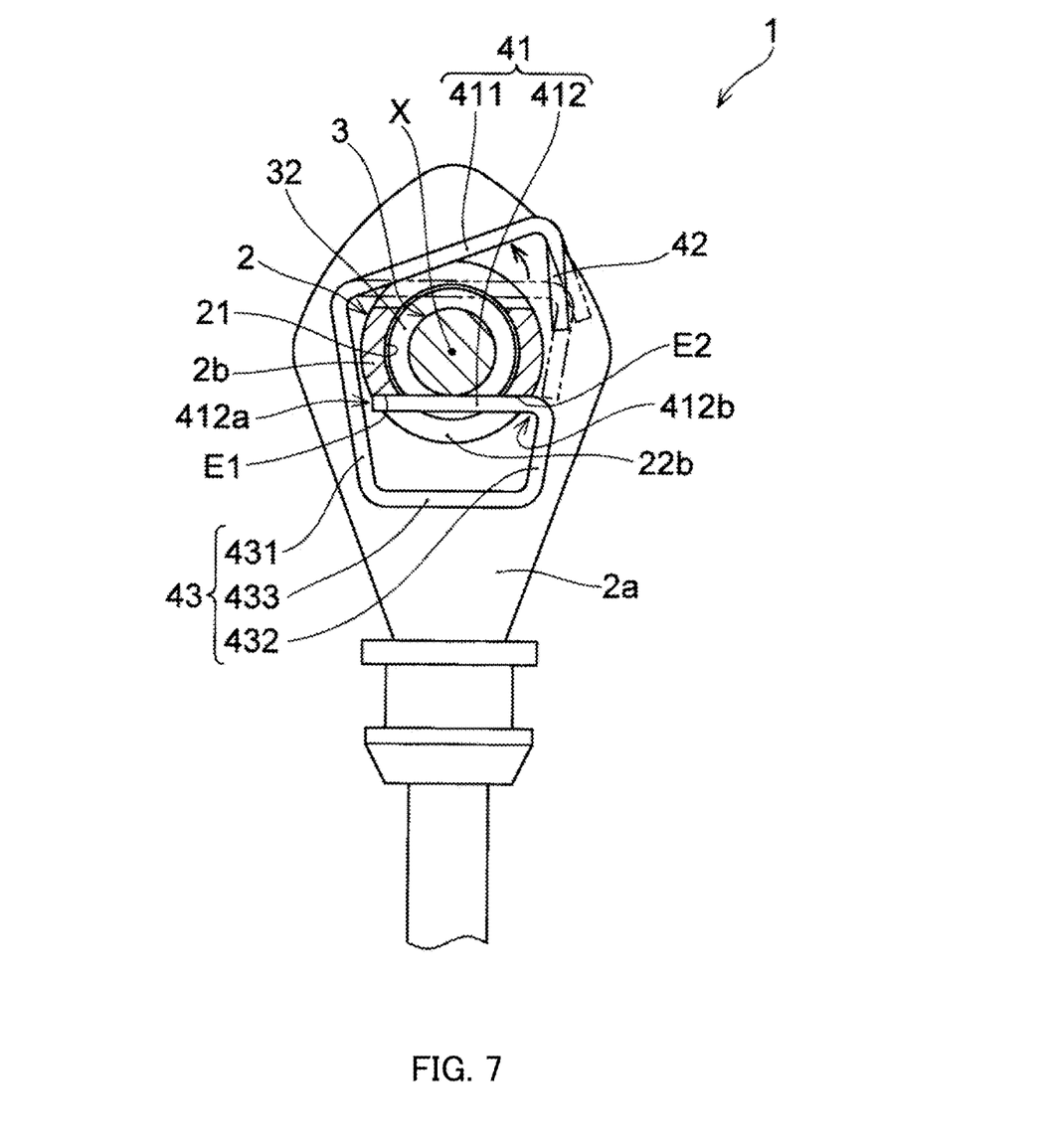
FIG. 7 illustrates a state in which the first holding element of the engaging member is deformed from the state illustrated in FIG. 4 such that the angle formed by the first holding element and the second extension part of the engaging member is expanded.

Further, as illustrated in FIG. 7, when first holding element 411 moves (is deformed) such that angle θ1 (see FIG. 5) formed by first holding element 411 and second extension part 431 becomes larger, a force to detach second holding element 412 from opening 22b is applied to second holding element 412. Since second holding element 412 has the length such that the end part thereof comes into contact with outer member 2 or inner member 3, one-side end part 412a or another-side end part 412b of second holding element 412 abuts on outer member 2 or inner member 3 when the force to detach second holding element 412 from opening 22b is applied to second holding element 412. Thus, second holding element 412 is restrained from moving in a direction in which second holding element 412 is detached from opening 22b, and engaging member 4 is restrained from being detached from outer member 2. In the present embodiment, one-side end part 412a or another-side end part 412b of second holding element 412 comes into contact with both of end parts E1 and E2 of the opening edge of opening 22b in the circumferential direction of tubular part 2b of outer member 2, and thereby second holding element 412 is restrained from being detached from opening 22b. Note that, as illustrated in FIG. 7, when angle θ1 formed by first holding element 411 and second extension part 431 (see FIG. 5) is widened, a distance between first extension part 42 and third extension part 432 becomes wider, and the larger the gap thereof becomes, the more easily engaging member 4 is detached. In the present embodiment, since angle θ2 (see FIG. 5) formed by first holding element 411 and first extension part 42 is smaller than 90°, the distance between first extension part 42 and third extension part 432 is narrower than that in a case where θ2 is 90° (the first extension part in the case where θ2 is 90° is indicated with a two-dot chain line in FIG. 7). Accordingly, engaging member 4 is hardly detached from outer member 2.

Further, as illustrated in FIG. 5, first extension part 42 at least has a length substantially reaching an intersection of third extension part 432 and second holding element 412. Thus, given a state in which there is substantially no gap between first extension part 42 and the intersection of third extension part 432 and second holding element 412, engaging member 4 is hardly detached from outer member 2 via the gap. Further, due to the state in which there is substantially no gap between first extension part 42 and the intersection of third extension part 432 and second holding element 412, a leading end of first extension part 42 is hardly caught by another member or the like, and the gap is restrained from being widened.

As described above, in the present embodiment, outer member 2 and inner member 3 are connected by holding outer member 2 between first holding element 411 and second holding element 412, and causing first holding element 411 and second holding element 412 to engage with outer member 2 and inner member 3, respectively. In the case of a configuration in which outer member 2 is held between two of first holding element 411 and second holding element 412, workability in connecting outer member 2 and inner member 3 improves when first holding element 411 and second holding element 412 are caused to have a reduced wire diameter so as to be easily elastically deformed. On the other hand, when first holding element 411 and second holding element 412 are caused to be easily elastically deformed, engaging member 4 is deformed and is easily detached from outer member 2 or inner member 3. In the present embodiment, the configuration of engaging member 4 described above makes it possible to eliminate ease of detachment of engaging member 4 resulting from improving the workability in connecting outer member 2 and inner member 3 and to restrain engaging member 4 from being detached. Accordingly, in connection structure 1, when conveyed in a state in which outer member 2 and engaging member 4 before being attached to inner member 3 are engaged, or after outer member 2 and inner member 3 are engaged by engaging member 4 and connection structure 1 is assembled, engaging member 4 is restrained from being detached from outer member 2.

REFERENCE SIGNS LIST

1 Connection structure
2 Outer member
2a Body part

2b Tubular part
21 Fitted part
22a, 22b Opening
23a, 23b Outer-member engaging part
3 Inner member
31 Fitting part
31a First fitting part
31b Second fitting part
32 Groove (annular groove)
32a, 32b Inner-member engaging part
33 Leading-end part
4 Engaging member
41 Holding part
411 First holding element
411a One-side end part
411b Another-side end part
412 Second holding element
412a One-side end part
412b Another-side end part
42 First extension part
43 Connection part
431 Second extension part
431a First end part
431b Second end part
432 Third extension part
432a First end part
432b Second end part
433 Connection element
433a One-side end part
433b Another-side end part
C Cable
E1, E2 End part of an opening edge of the opening
L Lever
M Operation force transmission mechanism
P1 Operating part
P2 Operated part
R Rod
W1, W2 Wall part
X Axis of the inner member
θ1 Angle formed by the first holding element and the second extension part
θ2 Angle formed by the first holding element and the first extension part
θ3 Angle formed by the second extension part and the connection element
θ4 Angle formed by the third extension part and the connection element

The invention claimed is:

1. A connection structure, comprising:
an inner member coupled to a transmission member, comprising:
a column-shaped fitting part comprising an annular groove in an outer cylindrical surface thereof; and
a pair of inner-member engaging parts defined within the annular groove on opposing sides of the fitting part;
an outer member coupled to a control cable, comprising:
a fitted part comprising a cylindrical sidewall defining an inner cavity into which the fitting part of the inner member fits;
a pair of openings on opposing sides of the fitted part that extend between a cylindrical inner surface of the inner cavity and a cylindrical outer surface of the fitted part; and
a pair of outer-member engaging parts disposed within the openings,
wherein the fitting part is received within the inner cavity of the fitted part such that the annular groove is aligned with the pair of openings and the inner-member engaging parts are aligned with the outer-member engaging parts; and
an engaging member comprising a bent wire clip for restraining the fitting part within the fitted part, comprising:
a holding part comprising:
a first holding element comprising a straight wire segment received within one of the openings such to engage one of the inner-member engaging parts and the outer-member engaging parts, and having opposing first and second ends; and
a second holding element comprising a straight wire segment received within the other of the openings such to engage the other of the inner-member engaging parts and the outer-member engaging parts, and having opposing first and second ends,
wherein the first holding element and the second holding element are disposed substantially parallel to each other such that each of the first ends is on a side of a same direction in an axial direction of the first holding element or the second holding element;
a first extension part comprising a straight wire segment extending from the second end of the first holding element toward the second holding element in a direction intersecting the axial direction of the first holding element; and
a connection part extending between the second end of the second holding element and the first end of the first holding element, comprising:
a second extension part comprising a straight wire segment extending from the first end of the first holding element toward the second holding element in a direction intersecting the axial direction of the first holding element;
a third extension part comprising a straight wire segment extending from the second end of the second holding element away from the first holding element in a direction intersecting the axial direction of the second holding element; and
a connection element comprising a straight wire segment connected to an end part of the second extension part and an end part of the third extension part and extending substantially parallel to and coplanar with the first and second holding elements,
wherein the first holding element, the first extension part, and the second extension part are provided such that an angle formed by the first holding element and the second extension part, and an angle formed by the first holding element and the first extension part are each smaller than 90° so that a distance between the first extension part and the fitted part and a distance between the second extension part and the fitted part are relatively large on a side of the first holding element and are relatively small on a side of the second holding element,
wherein the second extension part and the connection element are provided such that an angle formed by the second extension part and the connection element is larger than 90°,
wherein the second holding element has a length such that an end part of the second holding element adjacent the first end thereof comes into contact with the fitted part or the fitting part when the second holding element moves such that the angle formed by the first holding element and the second extension part is enlarged, and wherein the first extension part at least has a length substantially reaching an intersection of the third extension part and the second holding element.

* * * * *